(12) United States Patent
Terada

(10) Patent No.: US 6,654,181 B2
(45) Date of Patent: Nov. 25, 2003

(54) LENS POSITION CONTROL APPARATUS

(75) Inventor: Shuichi Terada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/919,380

(22) Filed: Jul. 31, 2001

(65) Prior Publication Data

US 2002/0051302 A1 May 2, 2002

(30) Foreign Application Priority Data

Aug. 1, 2000 (JP) ........................................ 2000/233603
Jul. 26, 2001 (JP) ........................................ 2001/225550

(51) Int. Cl.⁷ ............................................. G02B 15/14
(52) U.S. Cl. ...................... 359/700; 359/696; 359/697; 359/701
(58) Field of Search ................................. 359/696, 697, 359/700, 701

(56) References Cited

U.S. PATENT DOCUMENTS 6,282,380 B1 * 8/2001 Yamamoto .................... 397/97
2002/0051302 A1 * 5/2002 Terada ......................... 359/699

* cited by examiner

Primary Examiner—David N. Spector
(74) Attorney, Agent, or Firm—Robin, Blecker & Daley

(57) ABSTRACT

A lens position control apparatus is disclosed which comprises a variable power lens unit that moves along the optical axis; a focusing lens unit; a drive unit for driving the variable power lens unit along the optical axis; a member defining the reference position to be used prior to execution of a focusing operation of the focusing lens unit, the member being movable along the optical axis in accordance with the movement of the variable lens unit; and a calculating unit for calculating the driven amount of the focusing lens unit from the reference position in association with the focusing operation thereof, wherein the focus lens is moved to the reference position first, and then driven again based on the distance moved.

9 Claims, 13 Drawing Sheets

FIG. 8
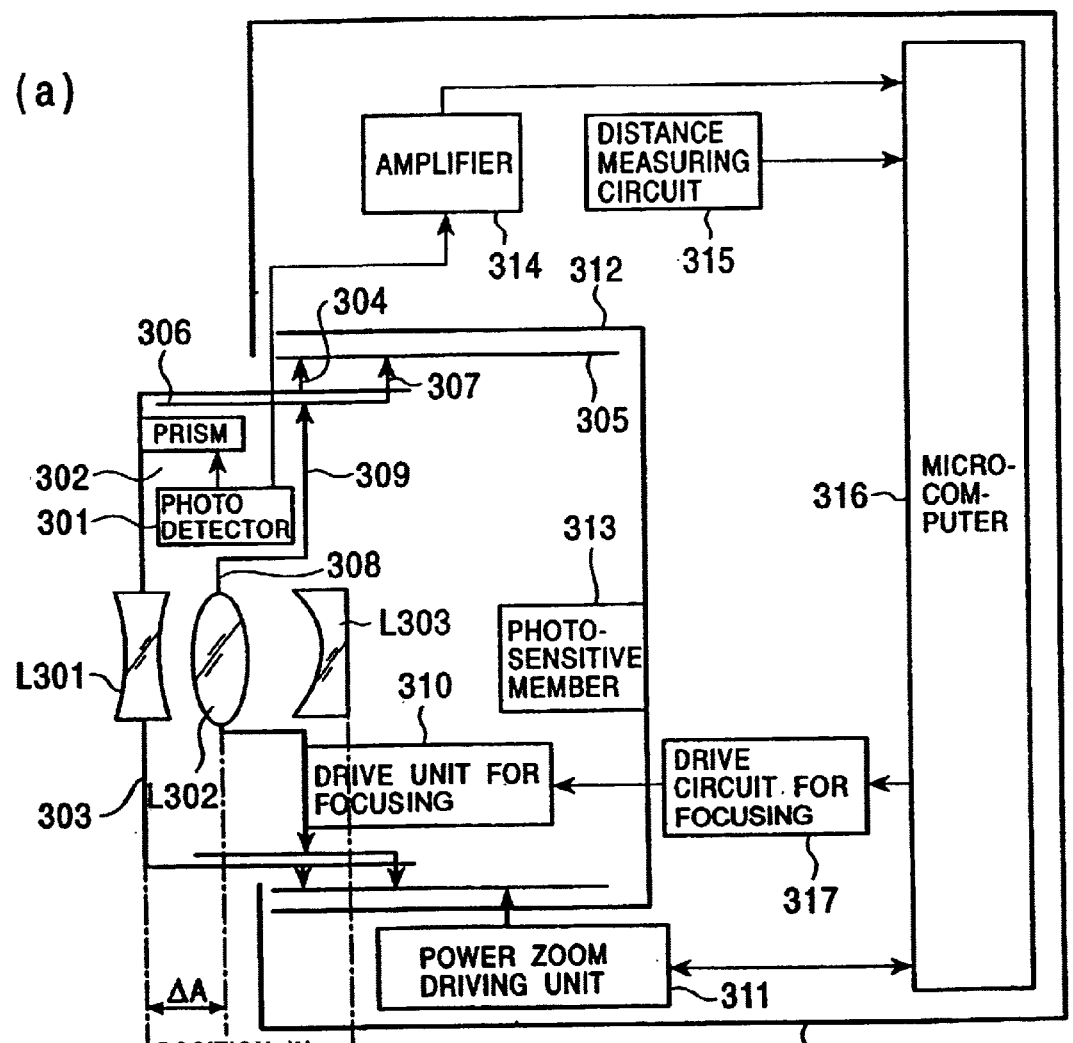
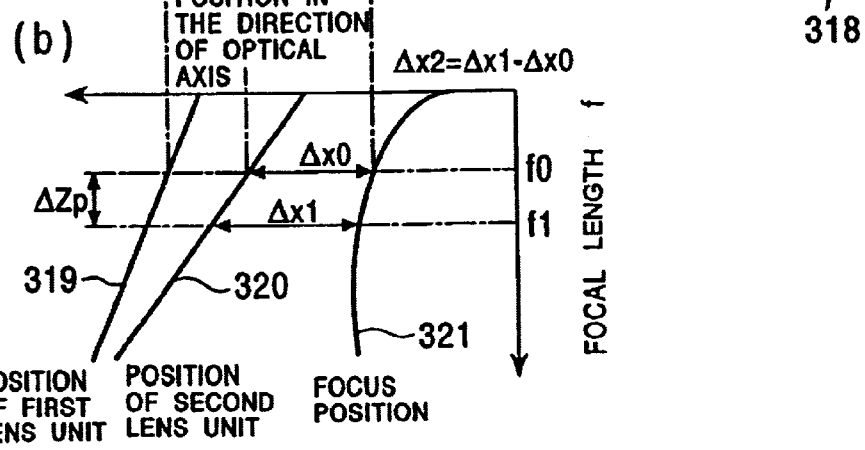

LENS POSITION CONTROL APPARATUS

BACKGROUND OF THE INVENTION

The present invention relates to an optical apparatus for driving a focusing optical element to the focus position according to the movement of a variable power optical element (that is, according to variations in focal distance).

The driving mechanism for a focusing optical element in the driving mechanism of a variable power optical system comprises, as in the focal length adjusting apparatus disclosed in the Japanese Patent No. 2,856,557, a first lens unit, a second lens unit, a motor for moving the second lens unit with respect to the first lens unit, moving means for moving the first and the second lens units and the motor in the direction of the optical axis as a single unit, detecting means for detecting the stop position of the first lens unit to be moved by the moving means, and determining means for determining the moved position of the second lens unit to be moved by the motor with respect to the first lens unit according to the result detected by the detecting means.

A general construction of the embodiment disclosed in the Japanese Patent No. 2,856,557 is shown in FIG. 8 and FIG. 9.

Part A of FIG. 8 shows the general construction of a camera according to an embodiment described above, and part B of FIG. 8 shows the extended position of each optical element at a prescribed zoom position. FIG. 9 shows a sequence of focusing operations in the camera of the embodiment described above.

In Part A in FIG. 8, the reference numeral L301 designates a first lens unit, the reference numeral 303 designates a lens-barrel of a first group, the reference numeral L302 designates a second lens unit, and the reference numeral 308 designates a lens-barrel of a second group. The reference numeral L303 designates a third lens unit.

The reference numeral 304 designates a cam pin of the first group provided around the outer periphery of the lens-barrel 303 of the first group, the cam pin 304 of the first group engages a cam groove of the first group formed on a rotatable cam cylinder 305 of the first group on the outer peripheral side of the lens-barrel 303 of the first group. The lens-barrel 303 of the first group is linearly guided by a linear guide member. Therefore, when the rotatable cam cylinder 305 of the first group rotates, the lens-barrel 303 of the first group is linearly driven in the direction of the optical axis by engagement between the cam groove of the first group and the cam pin 304 of the first group.

The reference numeral 306 designates a cam barrel of the second group, which is disposed inside the lens-barrel 303 of the first group. A cam pin 309 of the second group provided on the outer peripheral surface of the lens-barrel 308 of the second group engages a cam groove of the second group formed on the cam barrel 306 of the second group. In the cam barrel 306 of the second group, a drive pin 307 is provided, which passes through an elongated hole formed so as to extend in the circumferential direction on the lens-barrel 303 of the first group and engages the linearly guiding elongated hole formed so as to extend in the direction of the optical axis on the rotatable cam barrel 305 of the first group.

Therefore, the cam barrel 306 of the second group rotates in the same phase with the cam barrel 305 of the first group, and moves in the direction of the optical axis together with the lens-barrel 303 of the first group. When the cam barrel 306 of the second group rotates, the lens-barrel 308 of the second group is driven in the direction of the optical axis by engagement between the cam groove of the second group and the cam pin 309 of the second group, and then is linearly driven in the direction of the optical axis by the amount added with the distance moved of the cam barrel 306 of the second group in the direction of the optical axis.

The reference numeral 310 designates a drive unit for focusing for driving the third lens unit L303 in the direction of the optical axis, and is mounted on the bottom board of the second group fixed on the lens-barrel 308 of the second group.

The reference numeral 311 designates a power zoom driving unit comprising a motor and a decelerator for rotating the cam barrel 305 of the first group.

The reference numeral 312 designates a fixed cylinder, which also serves as a body of the apparatus for rotatably supporting the cam barrel 305 of the first group, and the reference numeral 313 designates a photosensitive member such as film, a solid-state imaging device or the like supported by the fixed lens barrel 312.

The reference numeral 314 designates an amplifier for amplifying the detected signal from a photodetector 301 described later, and the reference numeral 315 designates a distance measuring circuit. The reference numeral 316 designates a microcomputer, and the reference numeral 317 designates a drive circuit for focusing, which controls the drive unit for focusing 310. The reference numeral 318 designates an outer covering provided with the operating members such as a release switch, a zoom switch, or the like.

The photodetector 301 is fixed on the bottom board of the second group described above to be driven with the lens-barrel 308 of the second group as a single unit. The photodetector 301 comprises, as shown in FIG. 10, an infrared radiation floodlighting element 301a facing toward the entrance surface of a prism 302 held by the lens-barrel 303 of the first group, and a light receiving element portion 301b facing toward a slit plate 302a provided on the side of the projecting surface of the prism 302.

The infrared radiation emitted from the floodlighting element 301a is reflected by a reflecting surface 302d of the prism 302, and a portion of reflected light passed through the slit formed on the slit plate 302a is thrown on the light receiving element portion 301b as slit light. On the light receiving element portion 301b, two slit-shaped light receiving areas 301c, 301d are formed.

In the slit plate 302a, as shown in FIG. 11, slit rows S1 and S2 extend in parallel in the direction of the optical axis and are disposed so as to be orthogonal to the optical axis. Slit light passed through the slits in the row S1 is received in the light receiving area 301c and slit light passed through the slits in the row S2 is received in the light receiving area 301d.

In the row S1, the slits are formed at a regular pitch P1 in the direction of the optical axis, and a distance D between the slits of both ends of the row S1 is the same as the maximum value of the relative distance moved between the first lens unit L301 and the second lens unit L302.

On the other hand, each slit in the row S2 is displaced by an amount Z1 with respect to the corresponding slit in the row S1 except for the slit located at the center. The amount of displacement Z1 is the same for all the slits except for the slits on both ends of the row S2, and the direction of displacement is counterbraced. A displacement amount Z2 of the slits located on both ends of the row S2 is larger than Z1. The driving direction of the first lens unit L1 can be detected by the direction of displacement of the slit.

The position of the second lens unit L302 with respect to the first lens unit L301 (zoom position) can be detected by reading the amount of displacement described above from the output difference between the light receiving areas 301c and 301d.

More specifically, the photodetector 301 moves in the direction of the optical axis with respect to the prism 302 and the slit plate 302a together with the second lens unit L302, and wave shaped signals as shown in FIG. 12 are fed from the photodetector 301 every time the photodetector 301 passes over pairs of slits of the rows S1 and S2. The level of the signal of the photodetector 301 at the moment when the photodetector 301 is positioned at the center of the pairs of slits of the rows S1 and S2 is regulated to be a half the maximum output value thereof at each zoom position.

When the zoom positions shown by C1–Cn in FIG. 13 are specified by the operation of the zoom switch, the microcomputer 316 drives the first and the second lens units L301 and L302 via the power zoom driving unit 311. Every time the photodetector 301 reaches the position where a half the maximum output signal value is fed together with the second lens unit L302, a comparator feeds the signal, and at the moment when the count value of this signal becomes equal to the value of the specified zoom position n, the microcomputer 316 stops driving the first and the second lens units L301 and L302.

The positional relation between the first and the second lens units L301 and L302 at each zoom position is shown in FIG. 13.

When such a zooming operation is carried out, the microcomputer 316 calculates the position of the second lens unit L302 and the focus position where the third lens unit L303 should be driven based on the distance to the object measured by the distance measuring circuit 315 to move the third lens unit L303 to the focus position via the drive unit for focusing 310.

The focusing operation of the lens in the apparatus of such a structure will be described using a flow chart of part B in FIG. 8 and FIG. 9.

Part B in FIG. 8, the reference numeral 319 shows a position of the first lens unit L301 in the direction of the optical axis according to the zooming operation. The reference numeral 320 shows a position of the second lens unit L302 in the direction of the optical axis according to the zooming operation. In addition, the reference numeral 321 shows a position (focus position) of the third lens unit L303 in the direction of the optical axis corresponding to the zooming position with the object positioned at a prescribed distance.

Part B in FIG. 8 shows a state in which a position f0 is a zoom position, the focal distance of which is f0, and the photodetector 301 is positioned at the center of the pair of the slits (corresponding to the position C4 shown by the dotted line in FIG. 13, for example).

Assuming that the zooming operation is terminated and the first and second lens units L301, L302 are stopped at a focal distance f1 that is displaced from the focal distance f0 by $\Delta Zp$. Such a displacement of the stopped position occurs due to an operational response lag from the moment when the count value of the output signals from the comparator described above becomes equal to the value of the specified zoom position n until the first and the second lens units L301, L302 are actually stopped, or due to mechanical rattling.

When the release switch is operated in this state (step #1 in FIG. 9), the distance moved by the third lens unit L303 for focusing is calculated.

The microcomputer 316 calculates the amount of displacement of the zoom stop position from the center $\Delta Zp$ using the output of the photodetector 301 (step #2, #3).

As a next step, the reference distance moved $\Delta x0$ for obtaining the focus position of the third lens unit L303 with the object located at a prescribed distance as described above in the case where the second lens unit L302 is positioned at the center of a zoom position Zp is read from a ROM and expressed as $\Delta x$ (step #4, #5).

Then, the distance D to the object is measured using the distance measuring circuit 315, and $\Delta F(1/D)$ or the distance moved corresponding to the reciprocal of the distance to the object D is obtained from the ROM of the microcomputer 316, and then the value of $\Delta x$ added to $\Delta F(1/D)$ is expressed as $\Delta x$ (step #6, #7, #8).

Subsequently, information on the offset $\Delta x2$ ($\Delta Zp$) of the distance moved of the third lens unit L303 corresponding to the displacement information of the zoom stop position $\Delta Zp$ is read from the ROM (step#9). Then the value of $\Delta x$ added to $\Delta x2$ ($\Delta Zp$) is expressed as $\Delta x$ (step#10).

By this process, the distance moved of the third lens unit L303 at the focal length f1 calculated by the expression;

$$\Delta x1 = \Delta x0 + \Delta F(1/D) + \Delta x2(\Delta Zp)$$

is obtained, and the microcomputer 316 drives the third lens unit L303 to the focus position by this distance moved (step#11).

In this way, according to the embodiment described above, the difference ($\Delta Zp$) between the reference position (focal length f0) and the position where the first and the second lens units L301, L302 are actually stopped (focal length f1) is detected at each zoom position, so that the position of the third lens unit L303 is determined.

In other words, the detection accuracy of the displacement positions where the first and the second lens units L301, L302 are actually stopped $\Delta Zp$ from the reference zoom position affects the accuracy of the position of the third lens unit L303 to a large extent.

In addition, the zoom mechanism disclosed in Japanese Patent No. 2,505,192 comprises a focusing lens holding frame, a variable power lens holding frame, detecting means for detecting the position of the variable power lens holding frame, a storing unit for storing the distance moved of the focusing lens holding frame with respect to the distance moved of the variable power lens, and control means for converting the position of the variable power lens holding frame detected by the detecting means described above into the output corresponding to the distance moved of the focusing lens holding frame stored in the storing unit to move the focusing lens holding frame with respect to the variable power lens holding frame.

In this zoom mechanism as well, as in the case of the focal length adjusting apparatus disclosed in Japanese Patent No. 2,856,557, the detection accuracy of the detecting means for detecting the position of the variable power lens holding frame affects the accuracy of the position of the focusing lens holding frame to a large extent.

In order to detect the displacement $\Delta Zp$ of the reference zoom position from the position where the lens was actually stopped, the movable body detecting apparatus proposed in Japanese Unexamined Patent Application Publication No. 8-94903 is also used in addition to the photodetector shown in the embodiment in Japanese Patent No. 2,856,557.

As shown above, in order to increase the accuracy of the focus position of the focusing optical element, it is necessary to increase the accuracy of detection of displacement between the reference zoom position and the position where the variable power optical element is actually stopped. In addition, there is a tendency that miniaturization or increases in focusing sensitivity of the optical system increase the accuracy of the focus position required by the focusing optical element.

Therefore, for example, in the movable body detecting apparatus proposed in Japanese Unexamined Patent Application Publication No. 8-94903, the profile irregularity of the surface of the resistive element is improved to improve the accuracy of displacement detection between the reference zoom position and the position where the lens is actually stopped.

However, such an apparatus for detecting the position at high accuracy is expensive. In addition, miniaturization of or increase in focusing sensitivity of the optical system requires detecting accuracy greater than the limit of the conventional position detecting apparatus.

Accordingly, it is an object of the present invention to provide a lens control apparatus that can perform a focusing operation with high accuracy in association with a zooming operation while using less expensive position detecting means.

An aspect of the present invention is a lens position control apparatus comprising a variable power lens unit that moves along an optical axis; a focusing lens unit; a drive unit which drives the variable power lens unit along the optical axis; a member which defines the reference position to be used for calculating a driven amount of the focusing lens unit in association with the focusing operation thereof; and a linking member which links the member and the variable power lens, wherein the member moves along the optical axis in accordance with variable power lens unit through the linking member.

The lens position control apparatus of the present invention further comprises a focus lens drive unit which drives the focusing lens unit, and the focus lens drive unit drives the focusing lens unit toward the reference position prior to the focusing operation.

Especially, the focus lens drive unit drives the focusing lens unit based on the driven amount described above after the focusing lens unit reaches the reference position.

In addition, the variable power lens drive unit comprises a rotatable cam barrel, and the cam barrel is provided with cam grooves for moving the variable power lens unit and the member.

The lens position control apparatus of the present invention further comprises a position detecting unit which detects the cam position of the cam barrel, a distance detecting unit which detects the distance to the object, and a calculating unit which calculates the driven amount of the focusing lens unit from the reference position in association with the focusing operation thereof; and the calculating unit calculates the driven amount described above based on the position signal from the position detecting unit and the distance signal from the distance detecting unit.

The lens position control apparatus of the present invention further comprises a position detecting unit which detects the position of the variable lens unit, a distance detecting unit which detects the distance to the object, and a calculating unit which calculates the driven amount of the focusing lens unit from the reference position in association with the focusing operation thereof; and the calculating unit calculates the driven amount described above based on the position signal from the position detecting unit and the distance signal from the distance detecting unit.

The reference position of the member is a position corresponding to a prescribed distance to the object.

The prescribed distance to the object is an infinite distance to the object.

The focusing lens unit comprises a detecting section for detecting the reference position of the member.

The further characteristics of the present invention will be apparent from the description of the drawings.

BRIEF DESCRIPTION OF THE DRAWINGS

FIG. 8 part A is a drawing showing a structure of a conventional optical element driving apparatus and part B is a positional relation in the direction of the optical axis between a variable power lens and a focusing lens;

DESCRIPTION OF THE PREFERRED EMBODIMENTS

First Embodiment

Figure 1:
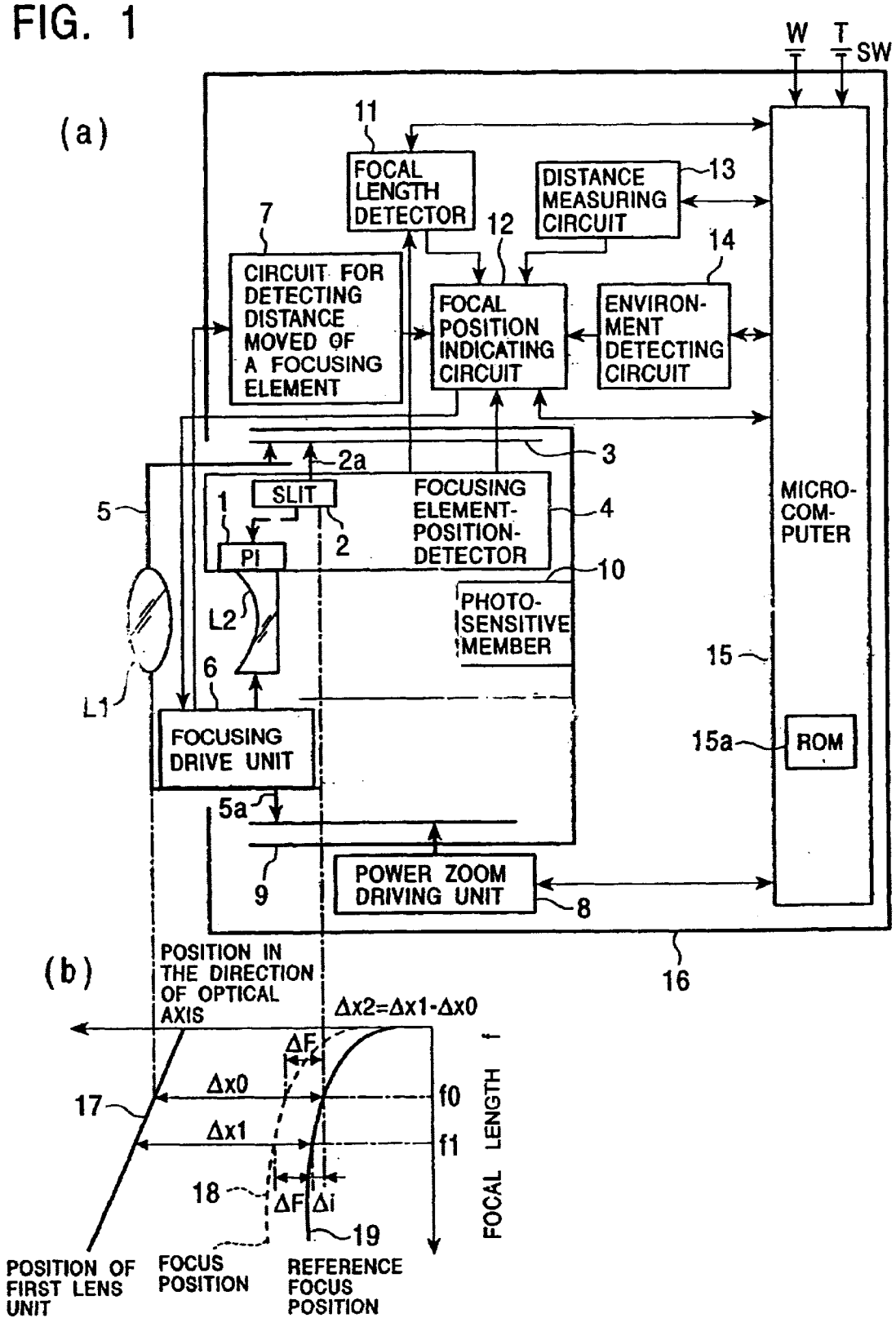
FIG. 1 part A is a drawing showing a schematic structure of a camera according to a first embodiment of the present invention and a part B is positional relation in the direction of the optical axis between a variable power lens and a focusing lens.
Figure 2:
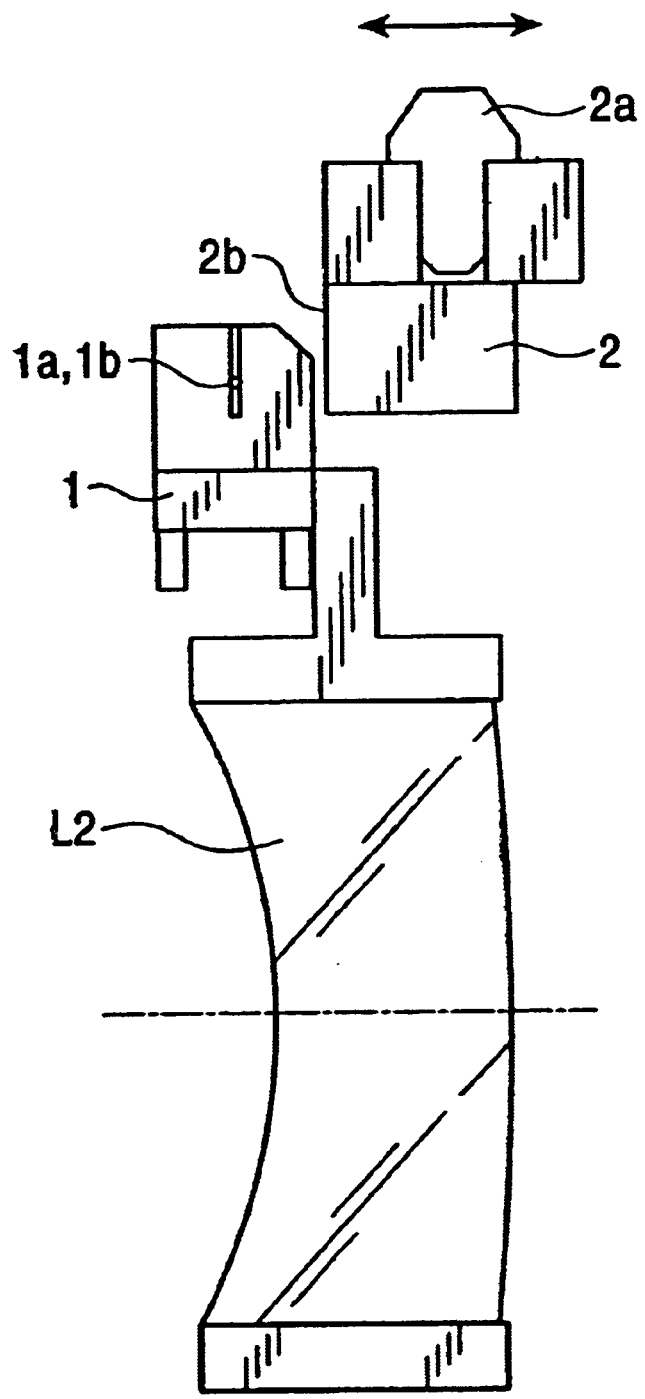
FIG. 2 is an enlarged view showing a photo interrupter and a slit plate in the camera described above.

Part A in FIG. 1 shows a schematic structure of a camera (optical apparatus) according to a first embodiment of the present invention. Part B in FIG. 1 shows a positional relation in the direction of the optical axis between a variable power optical element and a focusing optical element in the camera. FIG. 2 shows a photo interrupter 1 and a slit plate 2 to be provided on the camera.

In FIG. 1 parts A and B, the reference numeral L1 designates a first lens unit (variable power optical element), the reference numeral 5 designates a lens-barrel of the first group for holding the first lens unit L1, and the reference numeral 5a designates a cam pin of the first group provided on the outer periphery of the lens-barrel 5 of the first group.

The cam pin 5a of the first group engages a variable power cam groove, not shown, formed on the inner periphery of a cam barrel (cam member) 3 that is rotatably driven when being zoomed. The lens-barrel 5 of the first group is linearly guided by a linear guide member that is not shown in the figure and is held so as to be able to move in the direction of the optical axis. Therefore, when the cam barrel 3 rotates about the optical axis, the lens-barrel 5 of the first group and the first lens unit L1 are linearly driven in the direction of the optical axis by engagement between the variable power cam groove and the cam pin 5a of the first group for zooming operation.

The reference numeral 8 designates a power zoom driving unit comprising a DC motor or a stepping motor and a decelerator, which rotatably drives the cam barrel 3.

The reference numeral L2 designates a second lens unit (focusing optical element), and is held by a lens-barrel of the second group. The second lens unit L2 is located behind the first lens unit L1. In other words, they constitute a variable power lens of a so called rear focus type.

The reference numeral 6 is a focusing drive unit constructed from the stepping motor having a screw shaft as an output shaft and a guide bar for linearly guiding the lens-barrel of the second group in the direction of the optical axis and is fixed integrally to the lens-barrel 5 of the first group. The lens-barrel of the second group is provided with a rack member that engages the screw shaft without rattling at least in the direction of the optical axis, and when the stepping motor is actuated and the screw shaft rotates, engagement between the screw shaft and the rack member drives the lens-barrel of the second group and the second lens unit L2 in the direction of the optical axis together with a rack member for focusing.

The reference numeral 7 designates a circuit for detecting distance moved of the second lens unit L2 based on the number of steps driven by the stepping motor that constitutes the focusing drive unit 6.

The reference numeral 9 designates a fixed barrel lens barrel for rotatably supporting the cam barrel 3 integrally with the camera body that is not shown in the figure. The reference numeral 10 designates a photosensitive member such as a film or a solid-state imaging device or the like supported by the fixed barrel lens barrel 9.

The reference numeral 11 designates a focal length detector (the position detecting unit for detecting the position of the variable power lens unit.) comprising a potentiometer or the like for detecting a focal length of the optical system by detecting a rotational position of the cam barrel 3 (or the position of the first lens unit L1 in the direction of the optical axis).

The reference numeral 13 designates a distance measuring circuit for measuring the distance to the object, and the reference numeral 14 designates an environment detecting circuit for detecting the temperature and the humidity in the environment in which the camera is used.

The reference numeral 12 designates a focus position indicating circuit. The focus position indicating circuit 12 calculates the distance moved from a reference focus position required for achieving focusing of the second lens unit L2 based on signals from a focusing-element-position-detector 4, the circuit for detecting distance moved of the focusing element 7, the focal length detector 11, the distance measuring circuit 13 and the environment detecting circuit 14, and supplies driving instructions to the focusing drive unit 6 according to the result of calculation.

The reference numeral 16 designates an outer covering member of the camera having operating members SW such as a release switch that is not shown, a zoom switch for supplying command signals indicating the zoom position, or the like.

The reference numeral 15 designates a microcomputer for controlling the entire camera. The microcomputer 15 is provided with a memory (storing means) 15a such as a ROM in which the distance moved (distance moved for focusing) of the second lens unit L2 with the object located at a distance from the reference focus position according to the focal length (the position of the first lens unit L1), or data for correcting the distance moved of the second lens unit L2 for focusing according to the temperature or humidity detected by the environment detecting circuit 14 are stored.

As shown in FIG. 2 in detail, the reference numeral 1 designates a photo interrupter (PI: scanning section) constructed of a floodlighting element 1a and a light receiving element 1b. The photo interrupter 1 is fixed to the lens-barrel of the second group and is driven in the direction of the optical axis integrally with the second lens unit L2.

The reference numeral 2 designates a slit plate (a member defining the reference position) formed of slits. The slit plate 2 is provided with a pin portion 2a, and the pin portion 2a in turn engages a reference cam groove for focusing formed on the inner periphery of the cam barrel 3. The slit plate 2 is linearly guided by a linear guide member that is not shown in the figure. Therefore, when the cam barrel 3 rotates, the slit plate 2 is linearly driven in the direction of the optical axis (in the direction shown by the arrow in FIG. 2) by engagement between the reference cam groove for focusing and the pin portion 2a.

The reference cam groove for focusing drives the slit plate 2 so as to move (trace) along the reference focus position in association with the movement of the first lens unit L1 when being zoomed, as described later.

The photo interrupter (PI) 1 and the slit plate 2 constitute a focusing-element-position-detector 4.

The slit plate 2 is a board shaped member that intercepts the optical path between the floodlighting element 1a and the light receiving element 1b of the photo interrupter 1 by forward and backward movement in the direction of the optical axis, and comprises an edge portion 2b at the end surface in the direction of the optical axis.

At each zoom position, the signal level of the PI1 at the moment when the edge portion 2b of the slit 2 crosses the center of the floodlighting element 1a and the light receiving element 1b of the PI1 is adjusted to a half the output thereof, and this state determines that the slit 2 and the second lens unit L2 are at the reference focus position.

Figure 3:
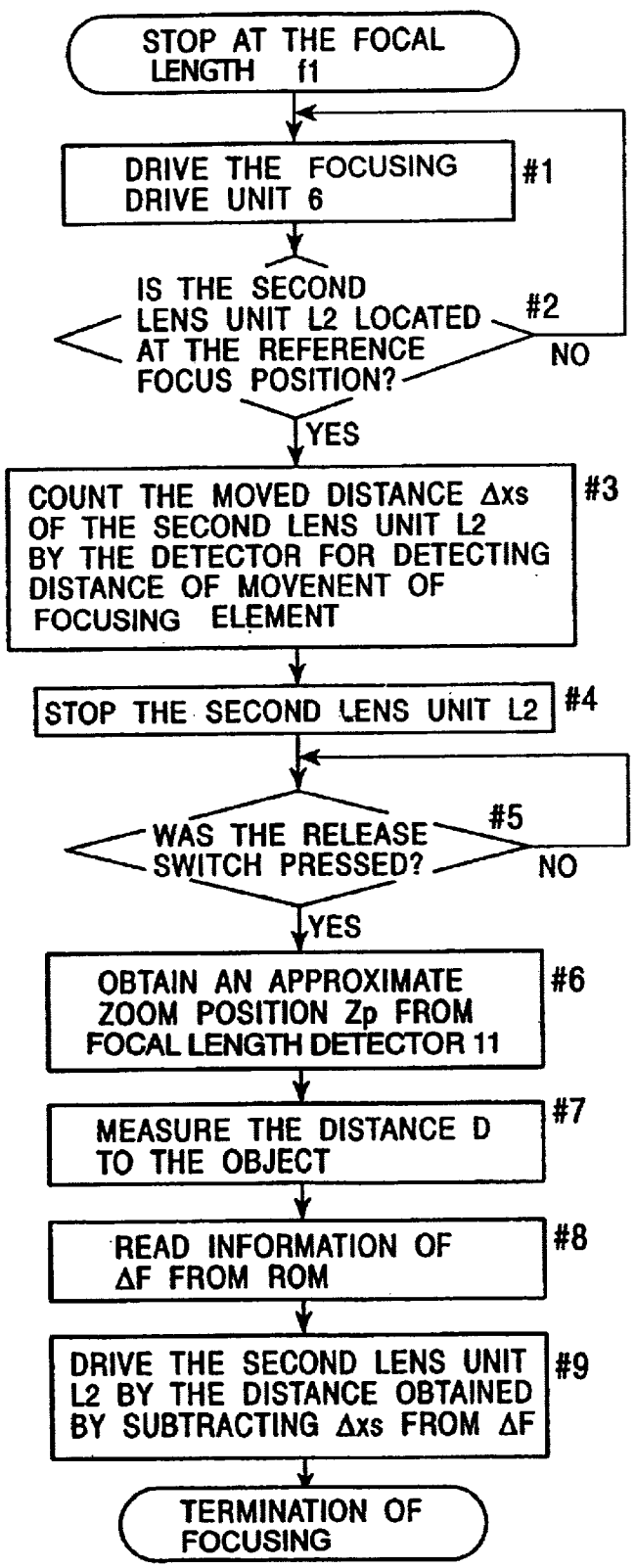
FIG. 3 is a flow chart showing a driving sequence of a focusing lens in the camera described above.

The focusing operation with the camera of such a structure will now be described. Part B in FIG. 1 shows the position of the lenses of the respective groups extended by zooming and focusing operations. FIG. 3 shows a flow chart of the zooming operation.

In Part B in FIG. 1, the reference numeral 17 designates the position of the first lens unit L1 in the direction of the optical axis that varies with the zooming operation. The reference numeral 19 designates the position of the second lens unit L2 when focusing on the prescribed distance to the object (infinite distance in this embodiment) according to the position of the first lens unit L1 (or the position offset from this position at a prescribed distance). In other words, the reference focus position varies with the zooming operation. In addition, the reference numeral 18 shows variations of the position of the second lens unit L2 (focus position) when focusing on a distance to an object other than the above-described prescribed distance to the object according to the position of the first lens unit L1.

Part B in FIG. 1, the line f0 shows a focal length in any one of zoom positions Zp among a plurality of zoom positions.

Now, assuming that the first lens unit L1 is moved by the zooming instruction aiming at the reference focal length f0 that is the zoom position Zp, the first lens unit L1 actually stops at a focal length f1, which is displaced by a slight amount ΔZp from the focal length f0 due to operational response lag or mechanical rattling.

However, the detector for detecting the zoom position (potentiometer) does not have resolution that can detect ΔZp.

The position of the focal length f1 is within the region that can be considered to be the same zoom position Zp as the position of the focal length f0, and the distance moved obtained when the second lens unit L2 moves from the position where it is focused on the infinite distance to the object (reference focus position) to a position where it is focused on a certain distance to the object ΔF can be considered to be approximately the same within this region.

Therefore, the ROM 15a described above must simply be stored with data on the distance moved for focusing at each distance to the object for each focal length at a plurality of zoom positions.

In this way, when the cam barrel 3 is rotated according to the zooming instruction (f0), the first lens unit and the slit 2 move in the direction of the optical axis along each cam groove. When the zooming action according to the zooming instruction (f0) is terminated, the first lens unit L1 and the slit actually stop at the focal length f1. Subsequently, the microcomputer 15 drives the focusing drive unit 6 through the focusing position indicating circuit 12 (step #1 in FIG. 2), and performs stepwise driving of the second lens unit. More specifically, the microcomputer 15 scans the slit plate 2 so as to cross the center of the floodlighting element 1a and the light receiving element 1b of the photo interrupter 1 by the use of the focusing-element-position-detector 4, or the second lens unit L2 is reset to the reference focus position (step #2). When the photo interrupter 1 detects the existence of the slit plate 2 (reference position), the microcomputer 15 stops driving the second lens unit. In this case, the second lens unit rarely stops at the reference position accurately, and in fact stops after overrunning by a distance corresponding to several pulses.

At this time, the microcomputer 15 counts the error in the distance moved of the second lens unit L2 overrun from the reference focus position to the actual stopped position via the circuit for detecting distance moved of the focusing element 7, and stores it as Δxs (step #3, 4). When the error in the distance moved can be determined in the designing step in advance, this value can be stored from the beginning to be used.

Here, part B in FIG. 1, the distance between the position of the first lens unit L1 at the focal length f0 and the reference focus position of the second lens unit L2 is represented by Δx0, the distance between the position of the first lens unit L1 at the focal length f1 and the reference focus position of the second lens unit L2 is represented by Δx1, and the difference between Δx1 and Δx0 is represented by Δx2. Δx2 designates variations in extended distance to the reference focus position of the second lens unit L2 caused by slight variations of focal length.

As described above, in the related art, since the value corresponding to Δx2 is calculated to drive for focusing, it was necessary to detect the difference ΔZp between the reference focal length f0 and the focal length f1 in which the lens is actually stopped with high accuracy.

In contrast, according to this embodiment, the slit plate 2 moves by Δi in the direction of the optical axis along the reference focus position while automatically correcting (absorbing) the error Δx2 of the extended distance of the second lens unit L2 by slight variations in focal length. Therefore, the second lens unit L2 can be driven to an accurate focus position for focusing by driving the second lens unit L2 from the reference focus position thereof when the focal length is f1, which is detected in step #2, by the distance moved for focusing (the same as the distance moved for focusing when the focal length is f0) for a certain distance to the object.

When the release switch that is not shown in the figure is operated with the error in distance moved Δxs stored in the ROM 15a as described above (step #5), the microcomputer 15 calculates the distance moved for focusing of the second lens unit L2 based on the zoom position (f0) signal and the distance measuring signal from the distance measuring circuit 13 in order to start the focusing operation based on the signal of distance measured from the distance measuring circuit 13 (step #6–9).

In the first place, the focus position indicating circuit 12 obtains the zoom position Zp by the use of the focal length detector 11 (step #6). The zoom position Zp detected here is, as described above, set at a region in which the distance moved of the second lens unit L2 from the reference focus position to the position where it is focused on a certain distance to the object ΔF is approximately the same. Therefore, as for the focal length detector 11, it is not necessary to detect the focal length (or the position of the first lens unit L1) with high accuracy, and thus an approximate focal length can simply be detected.

As a next step, the distance D to the object is measured by the distance measuring circuit 13 (step #7), and based on the distance D to the object, information on the distance moved for focusing ΔF from the reference focusing position with the distance D to the object of the second lens unit L2 located at the zoom position Zp to the focus position is read from the ROM 15a in the microcomputer 15 (step #8).

Subsequently, the error in distance moved Δxs of the second lens unit L2 from the stop position of the second lens unit L2 to the reference focus position counted and stored in the step #3, #4 is subtracted from the distance moved for focusing ΔF at the distance to the object D, and the second lens unit L2 is driven by the remaining distance moved. In this operation, the focusing on the distance D to the object may be achieved (step #9).

In this embodiment, immediately after the zooming operation, the second lens unit L2 is reset to the reference focus position. In this case, since the second lens unit L2 has completed the reset operation at the moment when the release switch is pressed, the second lens unit L2 can immediately be driven for focusing.

Assuming that the second lens unit L2 is not reset immediately after the zooming operation, but that the sequence in which the second lens unit L2 is reset at the moment when the release switch is pressed, and then driven for focusing, it is no longer necessary to use Δxs as described above. However, in this case, since the second lens unit L2 is moved to the reset position, the distance moved, and thus the driving time period increases.

The error in the distance moved Δxs also means that a braking distance is required for resetting the second lens unit L2, and detecting the reference focus position, and then stopping the second lens unit L2. Not to mention when the second lens unit is stopped accurately at the reference focus position, it is not necessary to take this Δxs into consideration.

As is described thus far, according to this embodiment, even when the first and the second lens units L1 and L2 are stopped at the position (f1) displaced from the reference position (f0) within the same zoom position, the error Δx2 in extended distance of the second lens unit L2 caused by slight variations of focal length thereof is corrected by the movement (the distance moved Δi) of the slit plate 2 along the reference focus position 19, focusing with high accuracy can be expected.

In other words, the influence of the detection accuracy on the position where the lens actually stopped and the displacement ΔZp of the zoom position from the reference position on the positional accuracy of the second lens unit L2 is reduced, and thus the detection accuracy required for the focal length detector 11 can be alleviated in comparison with the related art.

By constructing the focusing-element-position-detector 4 such that the slit plate 2 moves in the optical direction along the reference focus position 19 in association with the zooming operation and the photo interrupter 1 is driven along with the second lens unit L2 in the direction of the optical axis by the focusing drive unit 6, scanning for detecting that the second lens unit L2 is at the reference focus position 19 can be made simultaneously with the movement of the second lens unit L2 in the direction of the optical axis. In addition, by detecting the distance moved of the second lens unit L2 from the reference focus position 19 by means of the circuit for detecting distance moved of the focusing element 7, the second lens unit L2 can be moved to the focus position 18 with respect to the desired distance to the object.

In addition, by obtaining the zoom position by measuring the position of the cam barrel 3 driven by the power zoom driving unit 8 with a relatively less expensive focal length detector 11, the distance moved ΔF for focusing from the reference focus position of the second lens unit L2 to the focus position of the same at the above-described zoom position 18 can be obtained by the focus position indicating circuit 12 based on information from the distance measuring circuit 13 and the environment detecting circuit 14 so that focusing is achieved.

Second Embodiment

In this embodiment, differences from the first embodiment are mainly described, and components equivalent to those in the first embodiment are represented by the reference numerals of the first embodiment plus one hundred.

Figure 4:
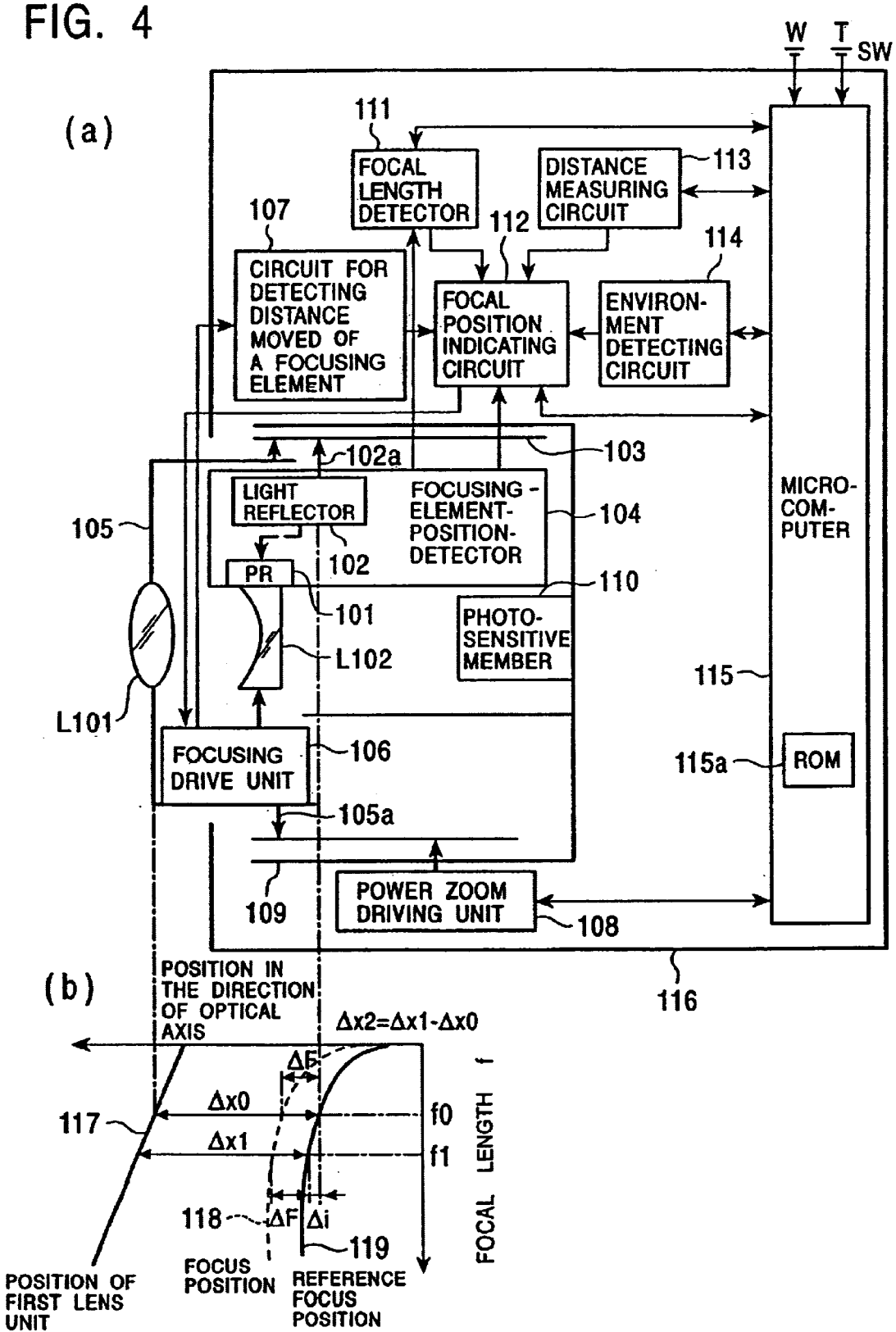
FIG. 4 part A is a drawing showing a general structure of a camera according to a second embodiment of the present invention, and part B is a positional relation in the direction of the optical axis between a variable power lens and a focusing lens.
Figure 5:
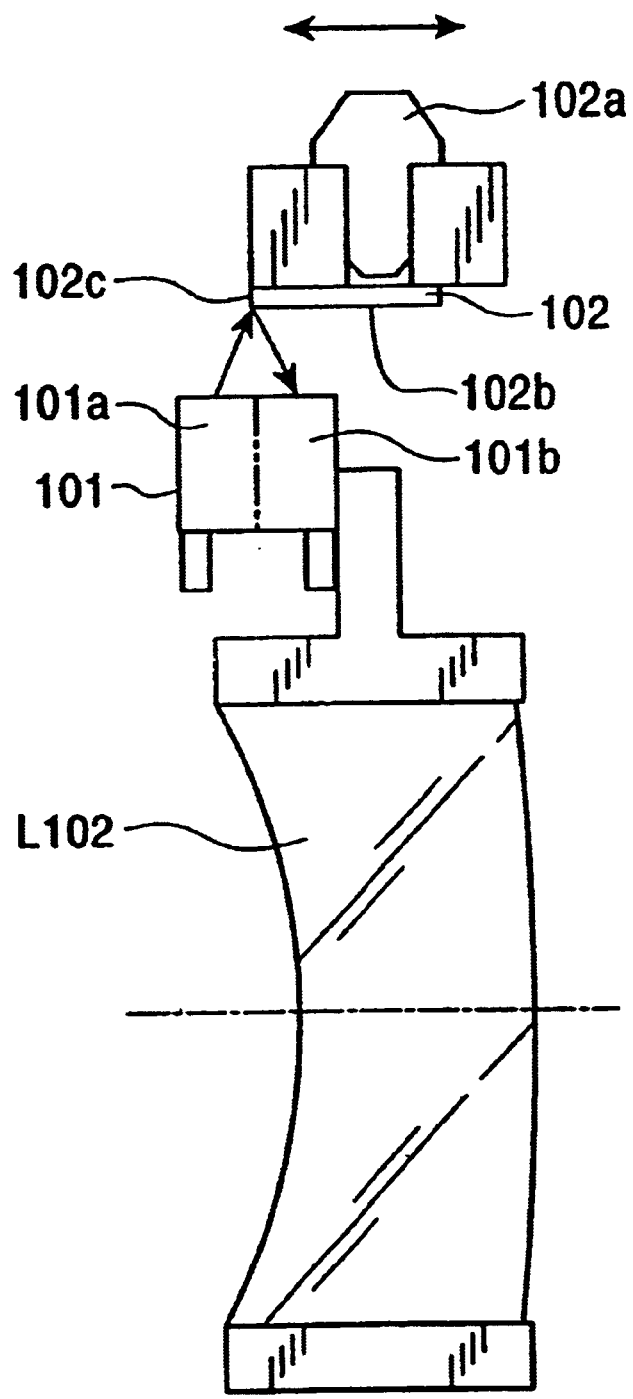
FIG. 5 is an enlarged drawing showing a photo reflector and a light reflector according to the second embodiment.

Part A in FIG. 4 shows the general structure of a camera (optical apparatus) according to a second embodiment. Part B in FIG. 4 shows the positional relation in the direction of the optical axis between the variable power optical element and the focusing optical element in the camera described above. FIG. 5 shows a photo reflector 101 and a light reflector 102 in the camera according to this embodiment.

In Part A in FIG. 4 and FIG. 5, the photo reflector 101 is (PR: scanning section) composed of a floodlighting element 101a and a light receiving element 101b, and is driven in the direction of the optical axis integrally with a second lens unit L102.

The light reflector 102 is for tracing a reference focus position 119, and a pin portion 102a engages a reference cam groove, not shown, for focusing formed on the inner periphery of a cam barrel 103. The light reflector 102 is linearly guided by a linear guiding member that is not shown in the figure. Therefore, when the cam barrel 103 rotates, engagement between the reference cam groove for focusing and the pin portion 102a linearly drives the light reflector 102 in the direction of the optical axis (the direction shown by the arrow in FIG. 5).

The reference cam groove for focusing drives, as in the case of the first embodiment, the light reflector 102 so as to move along (trace) the reference focus position 119 in association with the movement of a first lens unit L101 during the zooming operation.

The light reflector 102 comprises a reflecting surface 102b that reflects the floodlight from the floodlighting element 101a of PR 101 toward the light receiving element 101b, and an edge portion 102c located on the end surface of the reflecting surface 102b when viewed in the direction of the optical axis.

At each zoom position, the signal level of PR 101 in a state in which the edge portion 102c of the light reflector 102 is entering into the center portion of the floodlighting element 101a and the light receiving element 101b is adjusted to a half the output thereof, and in this state, the light reflector 102 and the second lens unit L102 are determined to be at the reference focus position 119.

The camera in this arrangement also performs the zooming and focusing operation as in the case of the first embodiment.

According to this embodiment, as in the case of the first embodiment, even when the first and the second lens units L101 and L102 are stopped at a position (f1) displaced from a reference position (f0) within the same zoom position, the error in extended distance Δx2 due to slight variations of the focal length of the second lens unit L102 is corrected by the movement along the reference focus position 119 of the light reflector 102 (the distance moved Δi), and thus high accuracy focusing is achieved.

In other words, the influence of the detection accuracy of the position where the lens actually stopped and displacement ΔZp of the zoom position from the reference position on the positional accuracy of the second lens unit L102 are reduced, and thus the detection accuracy required for the focal length detector 111 can be alleviated in comparison with the related art.

By constructing a focusing-element-position-detector 104 such that the light reflector 102 moves in the optical direction along the reference focus position 119 in association with the zooming operation and the photo reflector 101 is driven along with the second lens unit L102 in the direction of the optical axis by a focusing drive unit 106, scanning for detecting that the second lens unit L102 is at the reference focus position 119 can be made simultaneously with the movement of the second lens unit L102 in the direction of the optical axis. In addition, by detecting the distance moved of the second lens unit L102 from the reference focus position 119 by means of a circuit for detecting distance moved of the focusing element 107, the second lens unit L102 can be moved to the focus position 118 with respect to the desired distance to the object.

In addition, by obtaining the zoom position by measuring the position of the cam barrel 103 driven by a power zoom driving unit 108 with a relatively less expensive focal length detector 111, the distance moved ΔF for focusing from the reference focus position of the second lens unit L102 to the focus position of the same at the above-described zoom position can be obtained by a focus position indicating circuit 112 based on information from a distance measuring circuit 113 and an environment detecting circuit 114 so that focusing is achieved.

Third Embodiment

In this embodiment, differences from the first embodiment are mainly described and components equivalent to those in the first embodiment are represented by the reference numerals of the first embodiment plus two hundreds.

Figure 6:
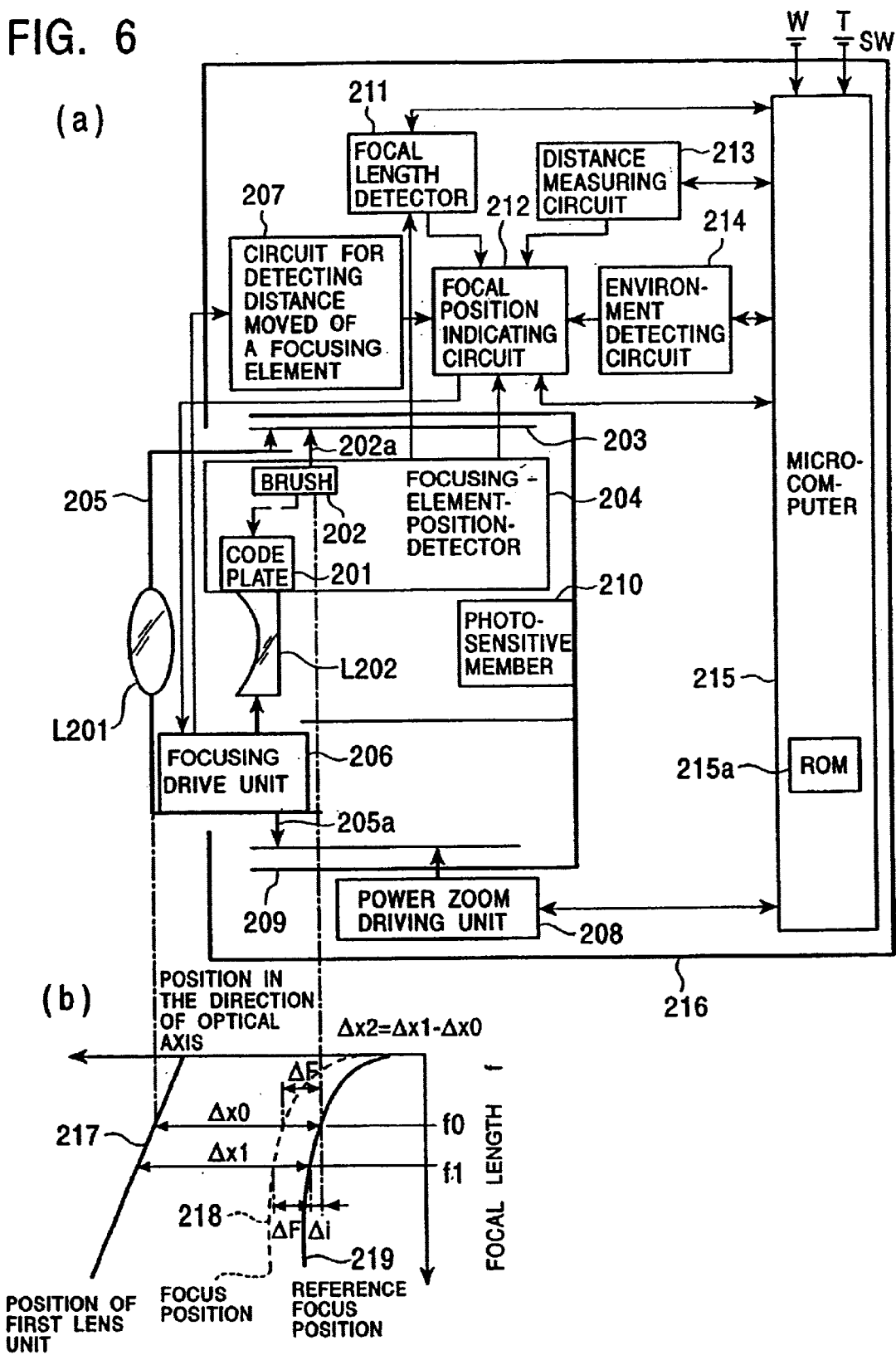
FIG. 6 part A is a drawing showing a structure of a camera according to a third embodiment of the present invention, and part B is a positional relation in the direction of the optical axis between a variable power lens and a lens.
Figure 7:
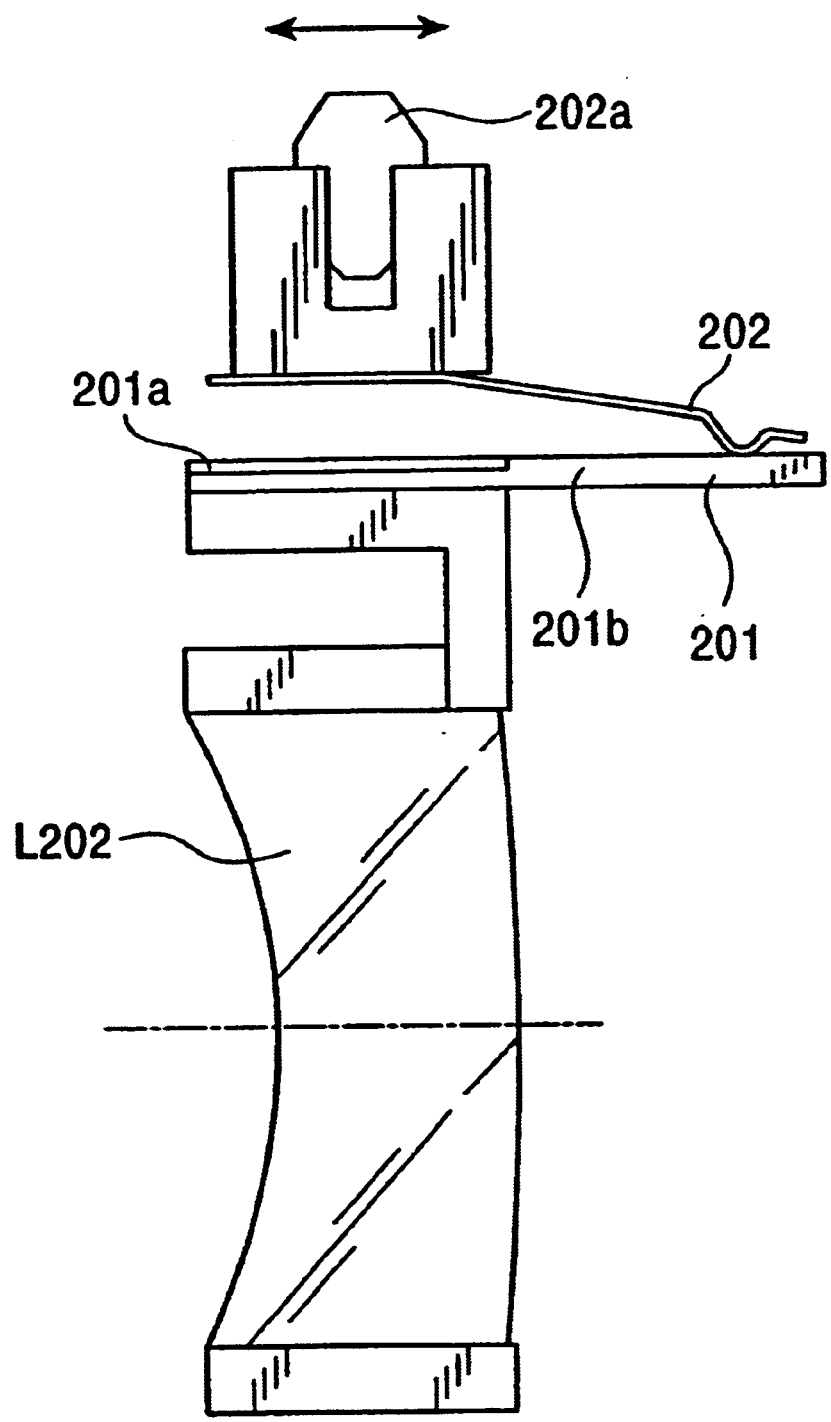
FIG. 7 is an enlarged drawing showing a code plate and a brush according to the third embodiment of the present invention.
Figure 9:
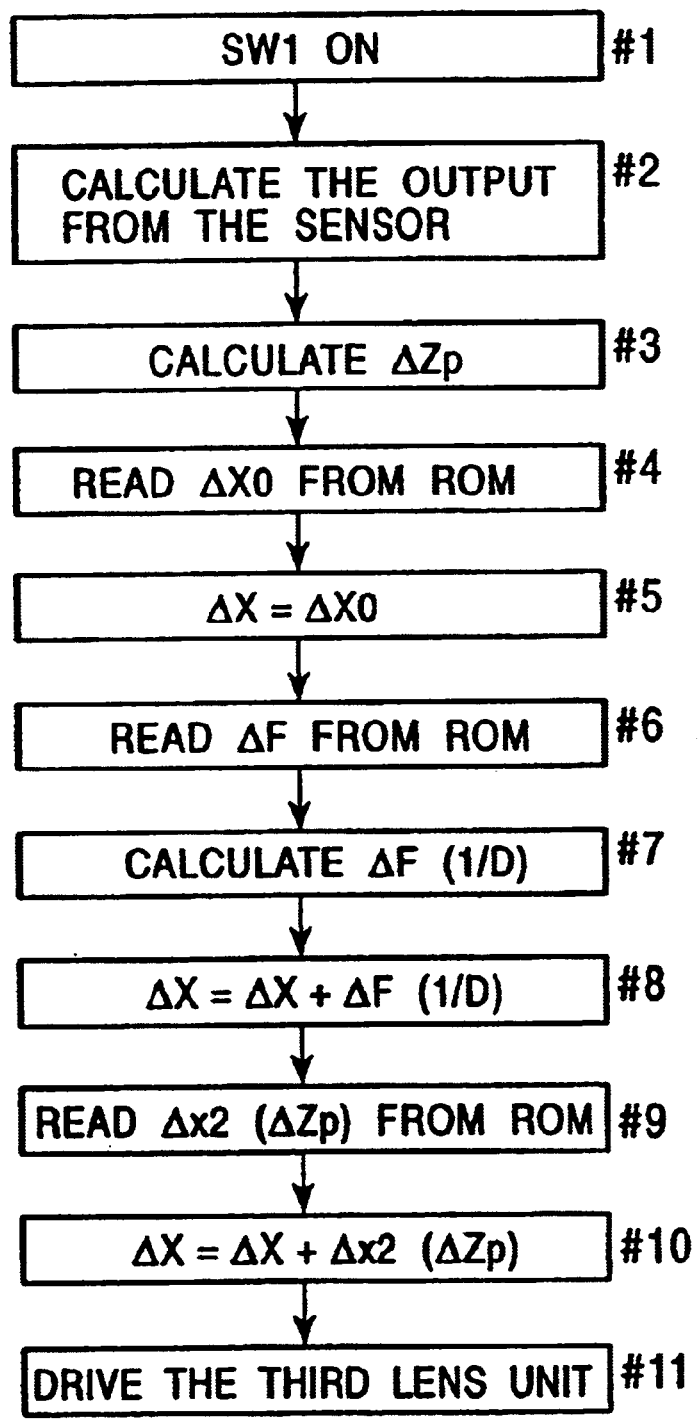
FIG. 9 is a flow chart showing a sequence of a focusing operation in the conventional optical element driving apparatus.
Figure 10:
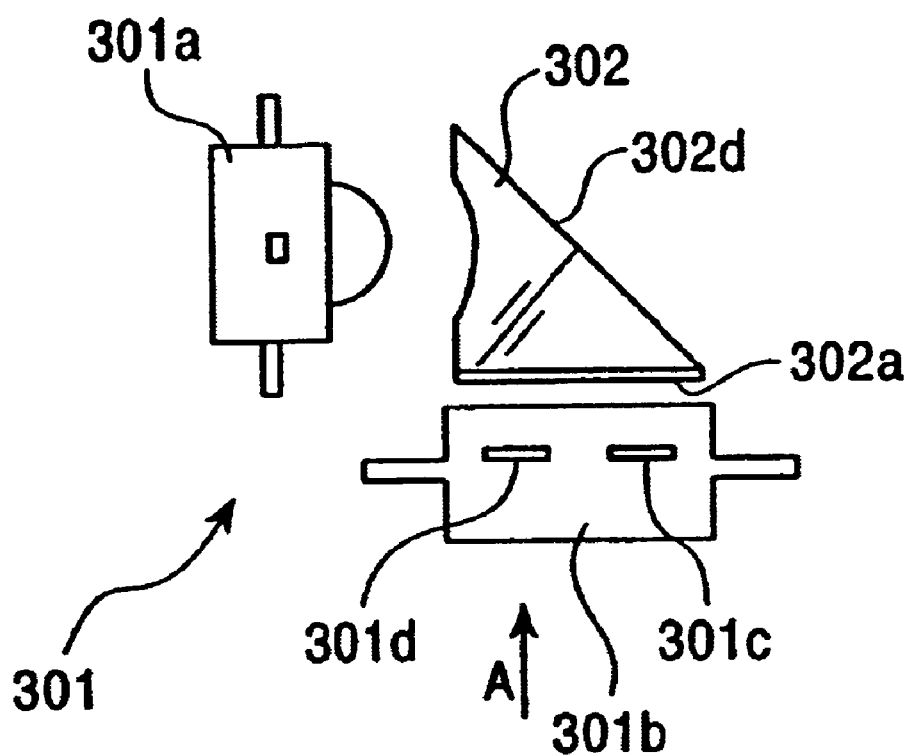
FIG. 10 is a schematic drawing showing a photodetector and a prism to be used in the conventional optical element driving apparatus.
Figure 11:
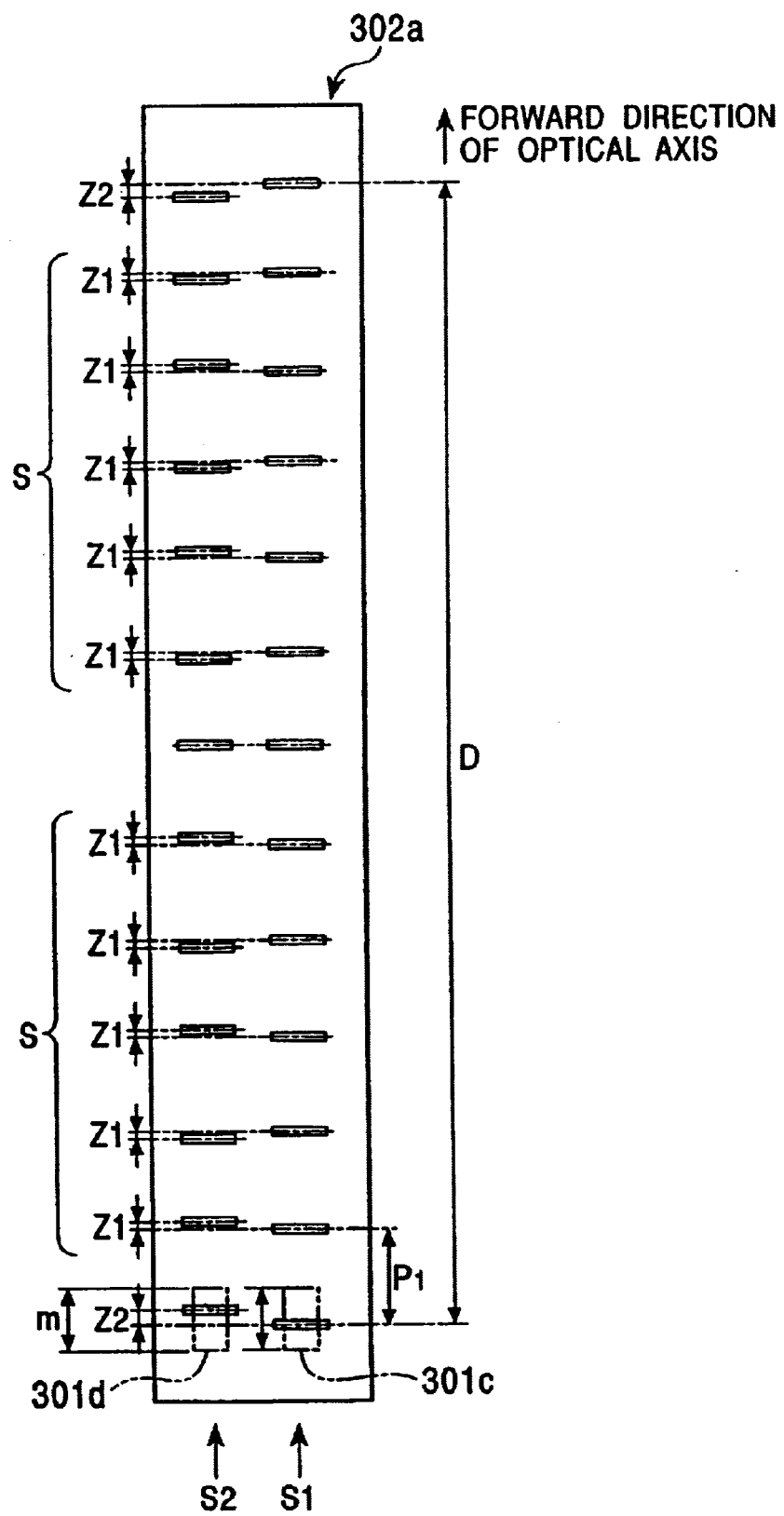
FIG. 11 is a schematic drawing of the slit plate provided on the prism.
Figure 12:
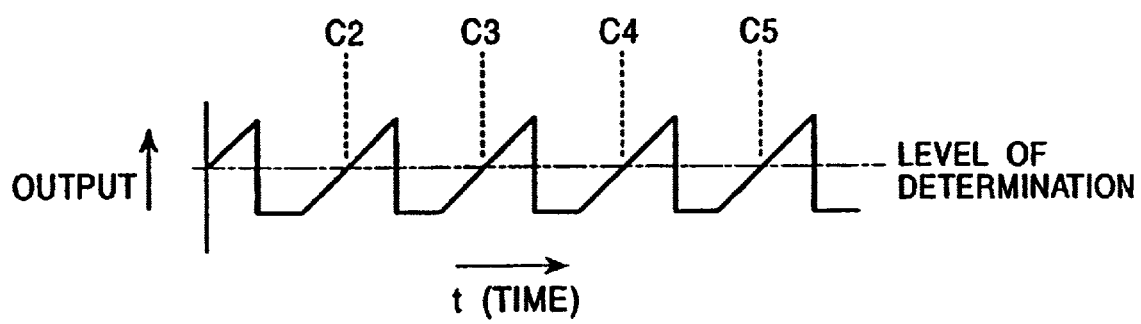
FIG. 12 is a waveform drawing of the output signal from the photodetector.
Figure 13:
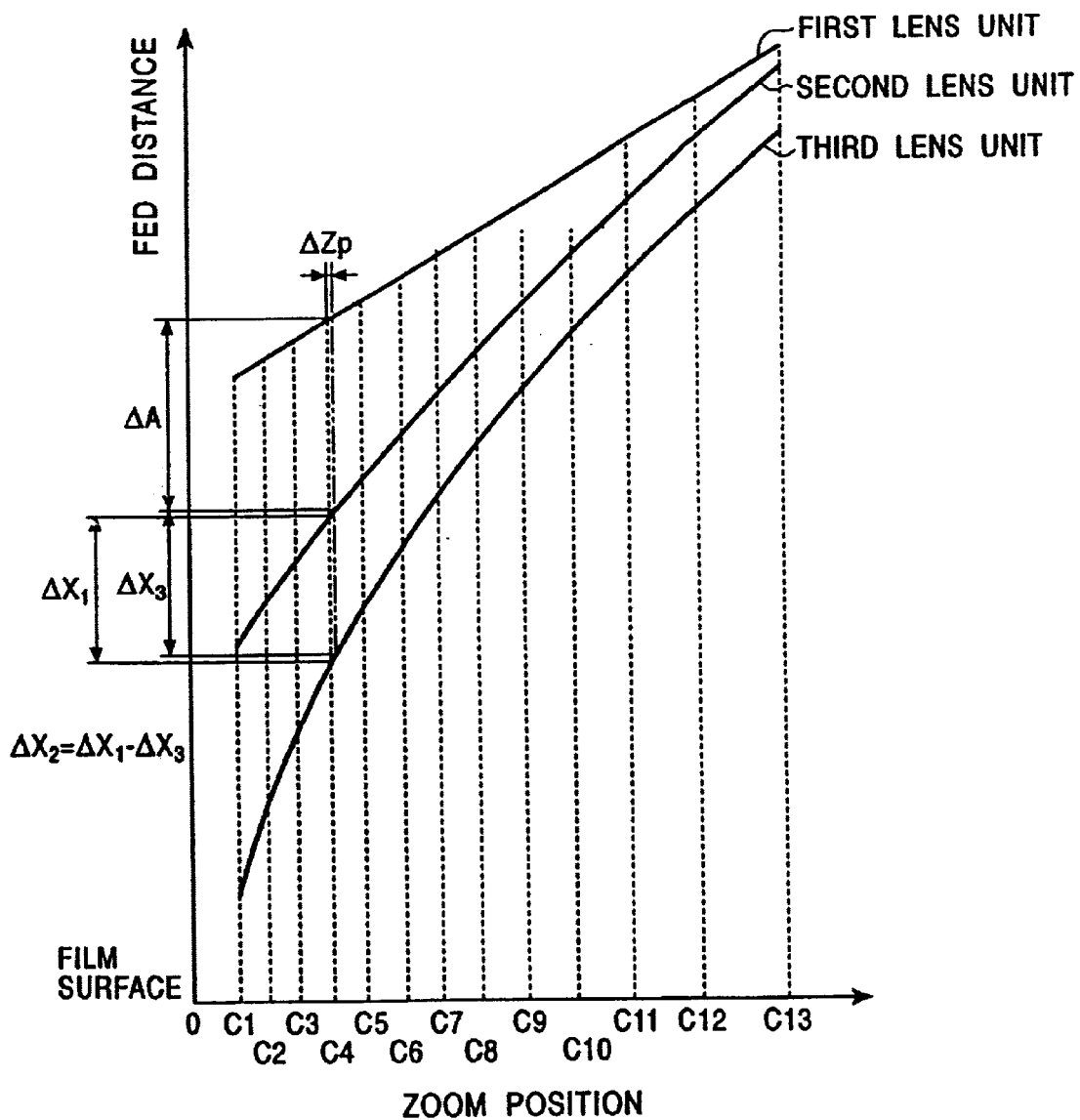
FIG. 13 is a drawing showing a positional relation of each group of lenses in the conventional optical element driving apparatus.

Part A in FIG. 6 shows the general structure of a camera (optical apparatus) according to a third embodiment. Part B in FIG. 6 shows the positional relation in the direction of the optical axis between the variable power optical element and the focusing optical element in the camera described above. FIG. 7 shows a code plate 201 and a brush 202 in the camera of the present invention.

In Part A in FIG. 6 and FIG. 7, the reference numeral 201 designates a code plate (scanning section) constructed of a conductive pattern 201a, a non-conductive pattern 201b, and a ground pattern that is not shown in the figure. The code plate 201 is driven in the direction of the optical axis (in the direction shown by the arrow in FIG. 7) integrally with the second lens unit L202.

The reference numeral 202 designates a brush (the portion for tracing the reference focus position) constructed of two electrically connected strips, one of which moves while being kept in contact with the conductive pattern 201a and the non-conductive pattern 201b, and the other one of which moves while being kept in contact with the ground pattern.

A pin portion 202a provided on the brush 202 engages a reference cam groove for focusing formed on an inner periphery of a cam barrel 203. The brush 202 is linearly guided by a linear guiding member. Therefore, when the cam barrel 203 rotates, engagement between the reference cam groove for focusing and the pin portion 202a linearly drives the brush 202 in the direction of the optical axis.

The reference cam groove for focusing drives, as in the case of the first embodiment, the brush 202 so as to move along (trace) the reference focus position in association with the movement of a first lens unit L201 during the zooming operation.

At each zoom position, the brush 202 and a second lens unit L202 are determined to be at the reference focus position when the brush 202 enters the boundary between the conductive pattern 201a and the non-conductive pattern 201b of the code plate 201, and the output signal of the code plate 201 is switched from Hi to Low or from Low to Hi.

The camera in this arrangement also performs the zooming and focusing operation as in the case of the first embodiment.

According to this embodiment, as in the case of the first embodiment, even when the first and the second lens units L201 and L202 are stopped at a position (f1) displaced from a reference position (f0) within the same zoom position, the error in extended distance Δx2 due to slight variations of the focal length of the second lens unit L202 is corrected by the movement along the reference focus position 219 of the brush 202 (the distance moved Δi), and thus high accuracy focusing is achieved.

In other words, the influence of the detection accuracy of the position where the lens actually stopped and displacement ΔZp of the zoom position from the reference position on the positional accuracy of the second lens unit L202 are reduced, and thus the detection accuracy required for the focal length detector 211 can be alleviated in comparison with the related art.

By constructing the focusing element position detector 204 such that the brush 202 moves in the optical direction along the reference focus position 219 in association with the zooming operation and the code plate 201 is driven along with the second lens unit L202 in the direction of the optical axis by a focusing drive unit 206, scanning for detecting that the second lens unit L202 is at the reference focus position 219 can be made simultaneously with the movement of the second lens unit L202 in the direction of the optical axis. In addition, by detecting the distance moved of the second lens unit L202 from the reference focus position 219 by means of a circuit for detecting distance moved of the focusing element 207, the second lens unit L202 can be moved to the focus position 218 with respect to the desired distance to the object.

In addition, by obtaining the zoom position by measuring the position of the cam barrel 203 driven by a power zoom driving unit 208 with a relatively less expensive focal length detector 211, the distance moved AF for focusing from the reference focus position of the second lens unit L202 to the focus position of the same at the above-described zoom position can be obtained by a focus position indicating circuit 212 based on information from a distance measuring circuit 213 and an environment detecting circuit 214 so that focusing is achieved.

In each embodiment described above, the case where detecting that the second lens unit is positioned at the reference focus position optically or electrically is described. However, it is also possible to detect whether the second lens unit is positioned at the reference focus position by systems other than those described thus far.

The structure of the camera described in each embodiment described above is given just for example, and other structures may also be employed.

In addition, although each embodiment described above describes a camera, it may also be applied to a lens barrel, observation apparatus, or other optical equipment.

As is described thus far, since the present invention is constructed in such a manner that the focusing optical element is reset and moved until it is detected to have reached the reference focus position by means of the portion for tracing the reference focus position that moves along the reference focus position in association with the movement of the variable power optical element and then is driven by the distance moved according to the distance to the object detected from the reference focus position to the focusing position, focusing can be achieved without detecting the position of the optical element with high accuracy, or without using an expensive position detecting means.

What is claimed is:

1. A lens position control apparatus comprising:
   a variable power lens unit that moves along an optical axis;
   a focusing lens unit;
   a drive unit which drives the variable power lens unit along the optical axis;
   a member which defines a reference position to be used for calculating a driven amount of the focusing lens unit in association with the focusing operation thereof and
   a linking member which links the member and the variable power lens,
   wherein the member moves along the optical axis in accordance with movement of the variable power lens unit through the linking member.

2. An apparatus as set forth in claim 1, further comprising:
   a focus lens drive unit which drives the focusing lens unit, wherein the focus lens drive unit drives the focusing lens unit toward the reference position prior to the focusing operation.

3. An apparatus as set forth in claim 2, wherein the focus lens drive unit drives said focusing lens unit based on said driven amount after said focusing lens unit reaches said reference position.

4. An apparatus as set forth in claim 1, wherein the variable power lens drive unit comprises a rotatable cam barrel, and said cam barrel is provided with cam grooves for moving the variable power lens unit and said member.

5. An apparatus as set forth in claim 4, further comprising:

a position detecting unit which detects the cam position of said cam barrel, a distance detecting unit which detects the distance to the object; and a calculating unit which calculates the driven amount of the focusing lens unit from the reference position in association with the focusing operation thereof wherein the calculating unit calculates said driven amount based on a position signal from said position detecting unit and a distance signal from said distance detecting unit.

6. An apparatus as set forth in claim 1, further comprising:

a position detecting unit which detects the position of said variable power lens unit, a distance detecting unit which detects the distance to the object; and a calculating unit which calculates the driven amount of the focusing lens unit from the reference position in association with the focusing operation thereof wherein the calculating unit calculates said driven amount based on a position signal from said position detecting unit and a distance signal from said distance detecting unit.

7. An apparatus as set forth in claim 1, wherein the reference position of the member is a position corresponding to a prescribed distance to the object.

8. An apparatus as set forth in claim 7, wherein the prescribed distance to the object is an infinite distance to the object.

9. An apparatus as set forth in claim 1, wherein the focusing lens unit comprises a detecting section for detecting the reference position of said member.

* * * * *

UNITED STATES PATENT AND TRADEMARK OFFICE
CERTIFICATE OF CORRECTION

PATENT NO.    : 6,654,181 B2
DATED         : November 25, 2003
INVENTOR(S)   : Shuichi Terada It is certified that error appears in the above-identified patent and that said Letters Patent is hereby corrected as shown below:

Column 2,
Line 66, delete "L1" and insert -- L301 --.

Column 3,
Line 66, delete "L301, L302" and insert -- L301 and L302 --.

Column 4,
Lines 32 and 36, delete "L301, L302" and insert -- L301 and L302 --.

Column 5,
Line 17, insert -- SUMMARY OF THE INVENTION --.

Column 12,
Line 67, delete "two hundreds" and insert -- two hundred --.

Column 15,
Line 4, delete "thereof" and insert -- thereof; --.

Signed and Sealed this

Twenty-first Day of February, 2006

JON W. DUDAS
*Director of the United States Patent and Trademark Office*